United States Patent [19]

Fowler

[11] 3,749,357
[45] July 31, 1973

[54] VALVE STRUCTURE HAVING FLUID PRESSURE ACTUATED SEATS

[75] Inventor: James M. Fowler, Houston, Tex.
[73] Assignee: ACF Industries, Incorporated, New York, N.Y.
[22] Filed: Apr. 7, 1972
[21] Appl. No.: 242,062

[52] U.S. Cl.............. 251/172, 251/175, 251/192, 251/315
[51] Int. Cl. ........ F16k 3/20, F16k 5/18, F16k 5/20
[58] Field of Search................... 251/172, 175, 192, 251/193, 315

[56] References Cited
UNITED STATES PATENTS

| | | | |
|---|---|---|---|
| 3,617,025 | 11/1971 | Gerbic et al. | 251/172 |
| 2,796,230 | 6/1957 | Grove et al. | 251/172 |
| 2,653,004 | 9/1953 | Schnyder | 251/172 |
| 3,421,733 | 1/1969 | Stewart, Jr. | 251/172 |
| 3,542,054 | 11/1970 | Works | 251/172 X |

Primary Examiner—William R. Cline
Attorney—Eugene N. Riddle

[57] ABSTRACT

A valve has a body providing a pair of coaxial flow passages and a space between said passages partly occupied by the valve element. Seat rings are located on opposite sides of the valve element and are slidably mounted in the valve body. A sealed chamber at the back of each seat ring is connected by a conduit to the flow passage on the opposite side of the valve. Each seat ring is provided with a resilient seal adapted to engage the valve element. Pressure is conveyed from the upstream side of the valve through the conduit to the chamber at the back of the downstream seat to move it against the valve element. In one embodiment, the valve element is a ball, and in other embodiments, it is a slidable gate or a rotary plug. The pressure applied to the downstream seat partly counterbalances the force applied on the upstream side of the valve element to reduce the transverse thrust on the journal bearings of the ball or rotary plug.

3 Claims, 10 Drawing Figures

PATENTED JUL 31 1973 3,749,357
SHEET 1 OF 3
FIG. 1
FIG. 2
FIG. 3
FIG. 4
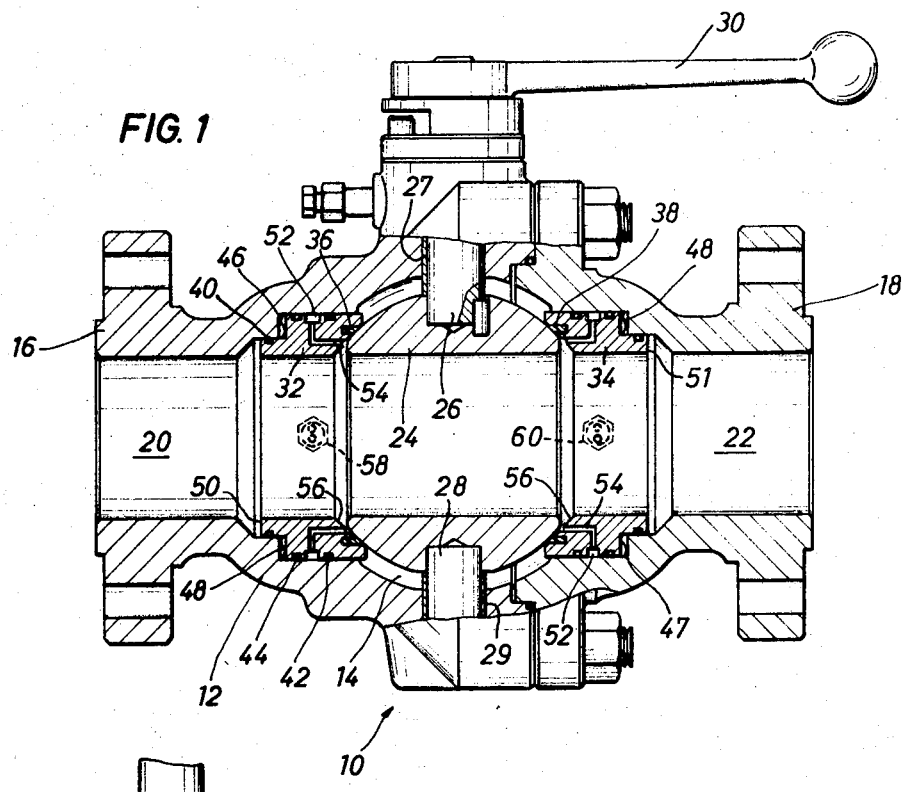
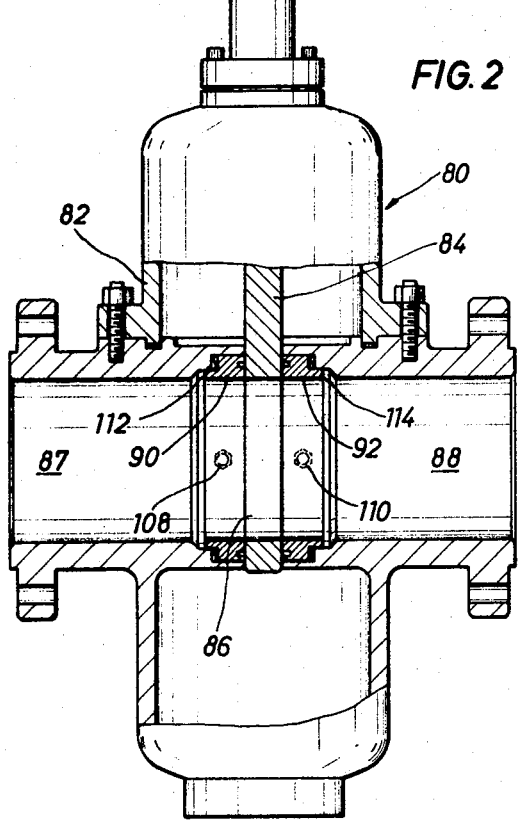
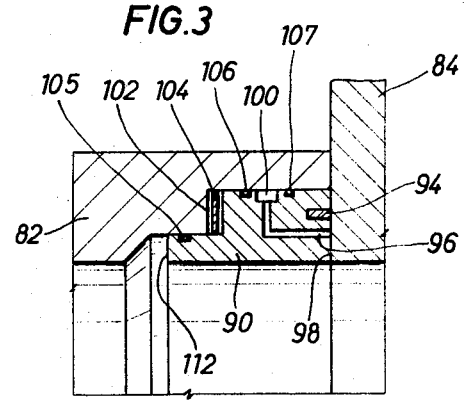
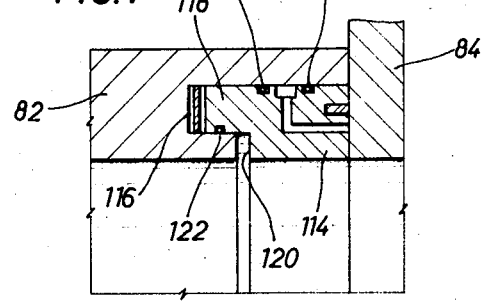

VALVE STRUCTURE HAVING FLUID PRESSURE ACTUATED SEATS

BACKGROUND OF THE INVENTION

Heretofore, valves have been provided with upstream and downstream sealing members which have been actuated by fluid pressure. In some cases, manual or automatic pilot valves are provided in the fluid pressure conduits for controlling the actuation of the seats. In the present invention, pilot valves are dispensed with and automatic actuation, particularly of the downstream seat, is obtained regardless of the direction of flow. One advantage of the invention is that the force supplied to the downstream seat partly counterbalances the force applied on the upstream side of the valve element, and thus reduces the resultant force on the bearings of the valve element.

BRIEF DESCRIPTION OF THE PRESENT INVENTION

In one embodiment, a valve having a spherical plug or ball valve is rotatably mounted in the valve body. A pair of annular seats are mounted in the valve body for engagement with opposite sides of the ball. The seats are in the form of pistons, adapted to be moved against the ball by pressure supplied to a chamber in which the seats are located. Each chamber is connected by a conduit to the opposite flow passage. Each seat has a flexible seal adapted to be pressed against the ball valve. The effective diameter of the seals is intermediate the inner and outer diameters of the chambers.

In other embodiments of the invention, a slidable gate valve and a rotary plug valve are provided with similar seats adapted to be actuated in the same manner as those described above.

BRIEF DESCRIPTION OF THE DRAWING

In the accompanying drawing in which several embodiments of the invention are illustrated:

FIG. 1 is a partly sectional view of a spherical plug valve structure having pressure actuated seats according to the invention;

FIG. 2 is a partly sectional view of a gate valve embodying the invention;

FIGS. 3 and 4 are fragmentary sectional views of two different seats for a gate valve;

DESCRIPTION OF THE PREFERRED EMBODIMENTS

Figure 5:
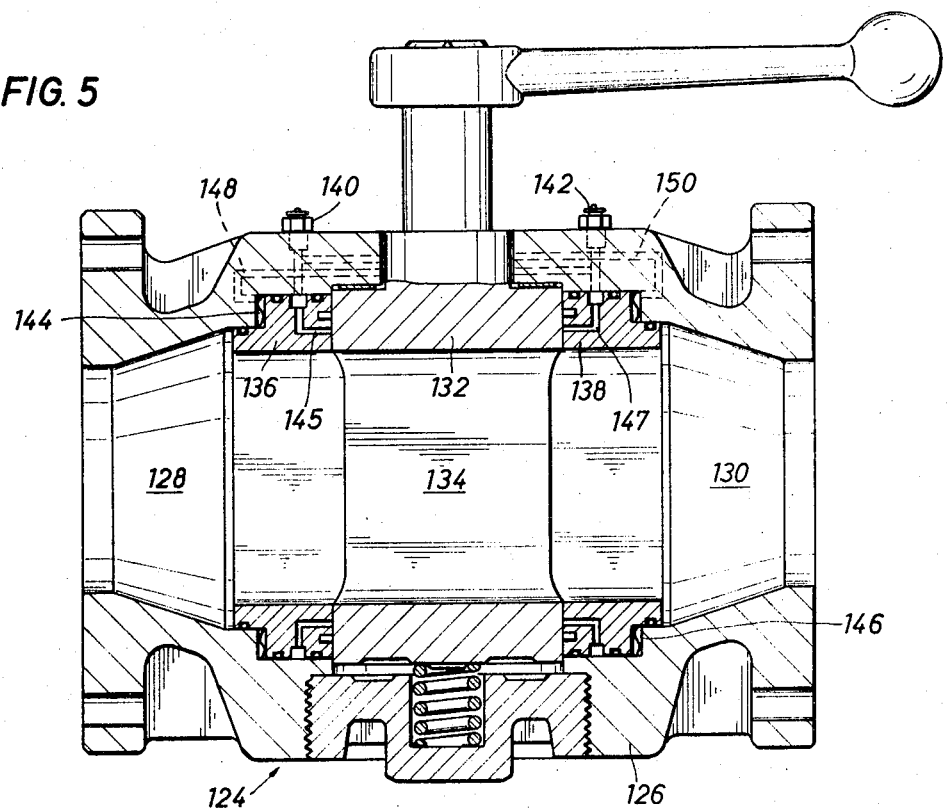
FIG. 5 is a sectional view of a plug valve constituting another embodiment of the invention.

In the drawing several types of valves are shown having seats automatically actuated by line pressure to favorable operating positions. In FIG. 1 valve 10 includes a body 12, having a cavity 14 and ends 16, 18 providing aligned flow passages 20, 22. Within cavity 14 is a spherical plug or ball 24 connected to upper shaft 26 and lower shaft 28 in suitable bearings 27, 29, for rotation by handle 30 to open and closed positions. Movable seats 32, 34 are fitted in body 12 on opposite sides of ball 24. The seats have flexible seal rings 36, 38 mounted in annular grooves. O-rings 40, 42, 44 seal each seat with respect to the body of the valve. These seals isolate chambers 46, 47 behind the seats, which chambers preferably contain springs 48 urging the seats against the ball valve. A rear surface 50, 51 of each seat is subjected to the fluid pressure in the adjacent flow passage 20 or 22. Annular groove 52 is connected by a plurality of passages 54 to a conical face 56 of the seat. Groove 52 is connected by suitable conduits or passages 58, 60 to chambers 46, 47 respectively, as shown schematically in FIGS. 6 to 10, with reference to which the operation of the valve arrangement will be described hereinafter. Generally, it is apparent that seats 32, 34 are urged into engagement with ball 24 by the pressure in chambers 46, 47, springs 48, and the pressure on rear surfaces 50, 51, and are urged away from ball 24 by line pressure in passages 20, 22 and the body pressure in cavity 14 acting against seats 32, 34, and the resulting effect on the seats will depend on the flow conditions and the position of ball 24.

Figure 6:
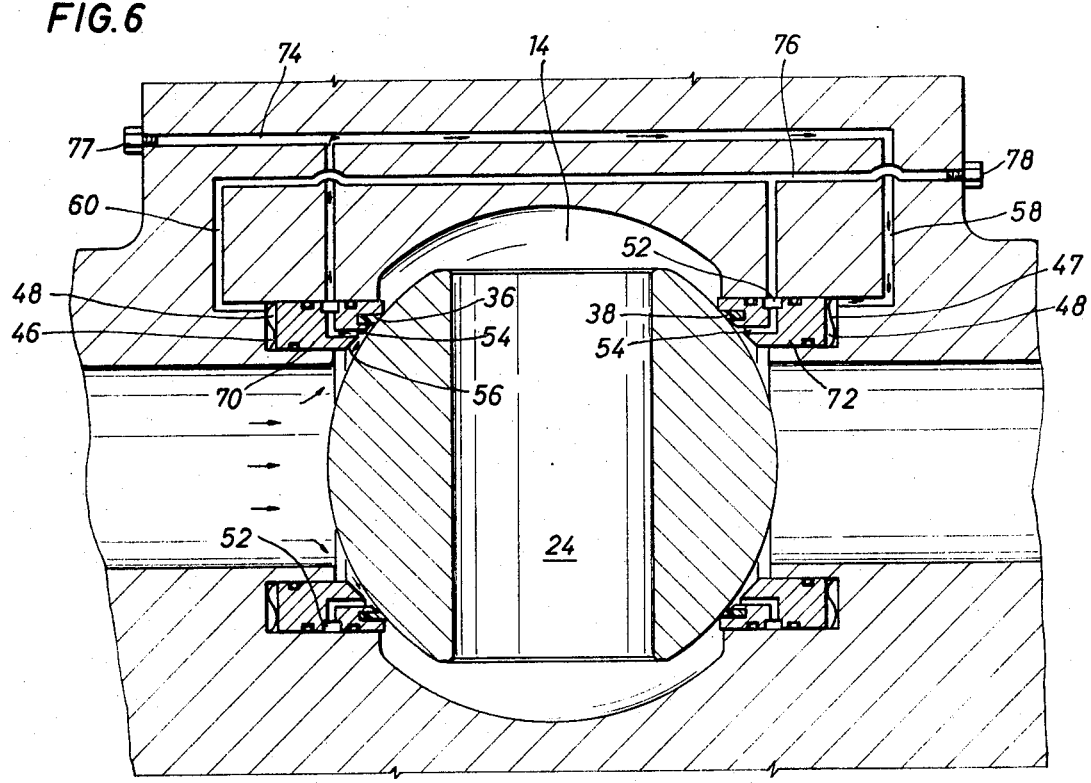
FIG. 6 is a partial sectional view of a valve according to the invention.
Figure 7:
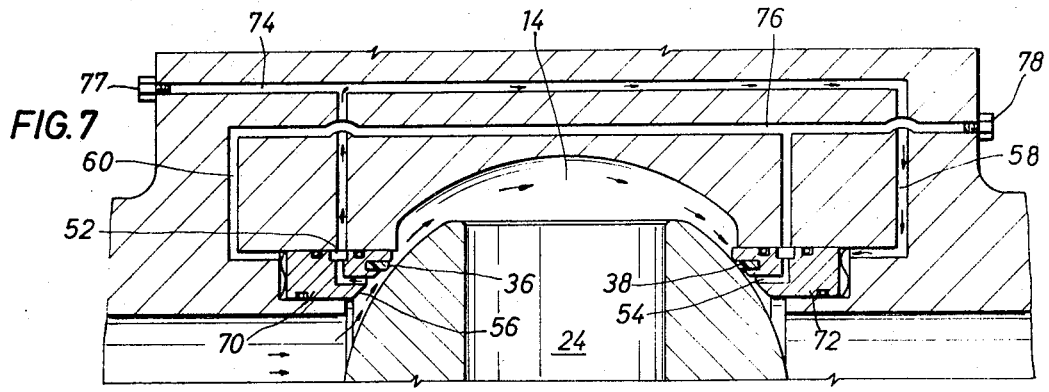
FIGS. 7 to 10 are fragmentary sectional views of the valve shown in FIG. 6 illustrating different operating conditions.

In FIGS. 6 to 10, seats 70 and 72 differ somewhat from those of FIG. 1, but their functioning is essentially the same, and accordingly, corresponding elements are given the same reference numbers. FIG. 6 shows the ball 24 in fully closed position. Chamber 46 is connected by conduits 58 and groove 52 and passage 54 of seat 72 to the downstream side of the valve. Similarly, chamber 47 is connected by conduits 60, and groove 52 and passage 54 of seat 70, to the upstream side of the valve. Lubricant between ball 24 and seats 32, 34 may be supplied by passages 74 and 76 communicating with conduits 58 and 60, and having closure fittings 77, 78. Initially flexible seals 36 and 38 are urged into engagement with ball 24 by springs 48. When an equilibrium is reached under line pressure, the pressure on the front face 56 of seat 70 has moved it back from ball 24, while the downstream seat 72 is held against ball 24 by the line pressure in its chamber 47. Thus, the line pressure automatically actuates the seats to provide downstream sealing, as indicated in FIG. 7. The force tending to move the ball downstream (ignoring springs 48) is $F_D = P_H \times A_O$, where $P_H$ is the line pressure and $A_O$ is the area enclosed by seal 38. The net force on the ball exerted by downstream seat 72 is $F_U = P_H \times A_S$, where $A_S$ is the effective annular area of seat 72 out to seal 38. The net force $F_D - F_U$ on journal bearings 27, 29 is, therefore, much less than the thrust $F_D$ applied to the bearings in conventional valves.

Figure 8:
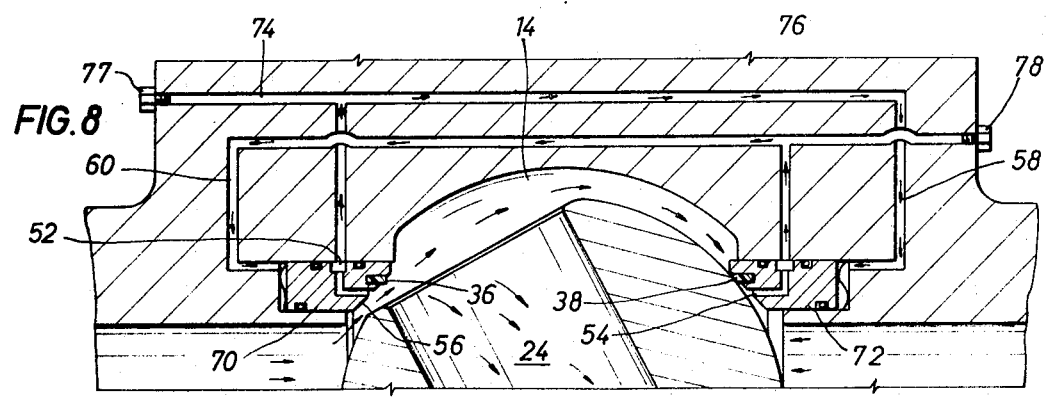

During opening, illustrated in FIG. 8, downstream seat 72 remains in contact with ball 24. The closing force on seat 72 is reduced by a low pressure developed on the downstream side of the valve. As the valve is opened further, upstream and downstream pressures begin to equalize and the pressure force on the seats is reduced to zero essentially as valve opening proceeds.

Figure 9:
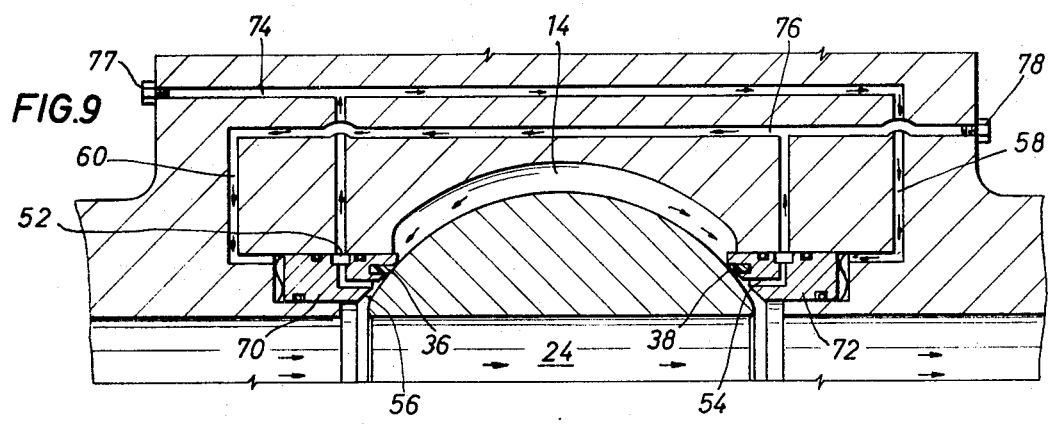

FIG. 9 shows the valve fully open. In this position the forces acting on seats 70 and 72 are balanced, except for the forces applied by springs 48, if they are used. Hence there is little or no load on flexible seals 36, 38 while the valve is in open operating position, and no thrust on journal bearings 27, 29.

Figure 10:
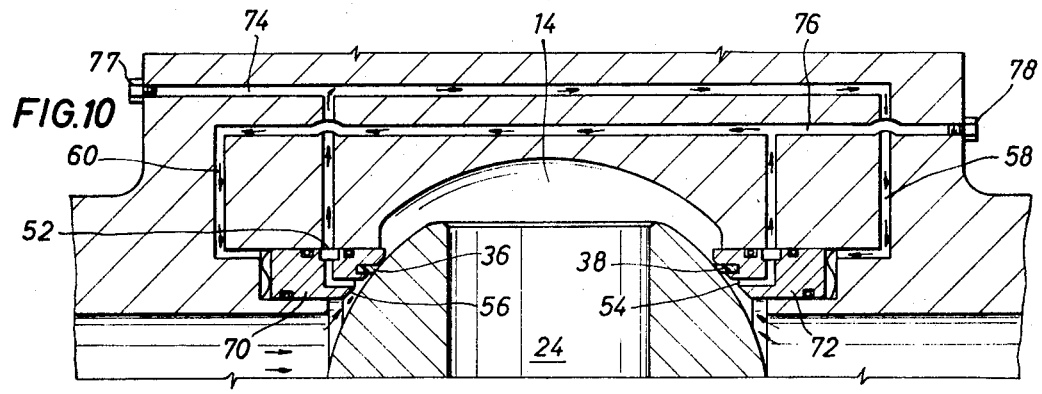

FIG. 10 shows the condition of valve 10 in closed position when there is line pressure on both sides of ball 24. Both seats are then closed with a large force, while the transverse thrust on journal bearings 27, 29 is essentially zero. Under this condition of high pressure on both sides of the valve, a high torque is normally needed to move the ball.

Thus, the present invention provides automatic pressure sealing, favorable journal bearing transverse thrust conditions, and permits easy seat lubrication. Furthermore, since the several passages are essentially "blind" ended and there are no accessible pockets, there is little chance for the lading to circulate and deposit so-called line "crud" or precipitate.

The applicability of the invention to a gate valve is indicated in FIGS. 2 and 3. Valve 80 includes a body 82 and a slidable slab 84 having an opening 76 between passages 87, 88; either of which may be the inlet or outlet. Annular seats 90, 92 are, as shown in FIG. 3, generally similar to the seats illustrated in FIG. 1. Each seat is provided with a flexible seal 94, passages 96 from seat face 98 to annular groove 100, and chamber 102, which may include a spring 104. O-rings 105, 106, and 107 seal the seats to body 82. Conduits 108 and 110 extend, similarly to those shown schematically in FIGS. 6 to 10, from annular groove 100 of each seat to chamber 104 of the opposite seat. The pressure in passages 87 and 88 act on the rear surfaces 112, 114, as well as acting on seating faces 98. When gate 84 is closed, upstream line pressure fed via passage 96, groove 100 and conduit 108 to chamber 102 of downstream seat 92 will move its seal 94 against the gate. In general, it will be understood that seats 90 and 92 will be actuated similarly to the seats of FIGS. 1 and 6 to 10.

FIG. 4 shows a modified seat 114 in which chamber 116 is at the end of the trailing portion 118 of the seat, and seat surface 120 acted on by line pressure is at an intermediate position on the seat. O-rings 122, 123 and 124 provide the required seals between seat 114 and body 82. It will be understood that seat 114 operates in the same manner as seat 90 of FIG. 3.

FIG. 5 indicates that the invention is applicable to a rotary plug valve. Valve 124 includes a body 126 having flow passages 128, 130, rotary plug 132 having flow passage 134, and movable seats 136, 138. Lubrication means 140, 142 are provided for the seats. Chambers 144 and 146 behind seats 136, 138 communicate by conduits 148, 150 and passages 145, 147 through the seats with flow passages 128, 130, so that each chamber is subjected to the pressure in the flow passage on the opposite side of the valve. Thus seats 136, 138 are actuated in the same manner as those previously described.

What is claimed is:

1. A valve comprising a valve body having upstream and downstream flow passages and a body space between said flow passages, a valve element in said body space mounted for movement between open and closed positions, annular downstream and upstream seat assemblies mounted in said valve body on opposed sides of the valve element, said seat assemblies being mounted for sliding movement toward and away from the valve element, a seal ring mounted on the face of each seat assembly adjacent the valve element and adapted to engage the valve element in sealing relation, recessed means on the valve body providing a sealed chamber on the back of each seat assembly, a conduit connecting the sealed chamber for the upstream seat assembly to the downstream flow passage only, and a separate conduit connecting the sealed chamber for the downstream seat assembly to the upstream flow passage only, said seal rings defining a perimeter of sealing contact with the valve element intermediate the inner and outer radial extents of said sealed chambers whereby fluid pressure from the upstream flow passage is in fluid communication with the sealed chamber of the downstream seat assembly to provide a greater force at the back of the downstream seat assembly than at the face thereof to bias the downstream seat assembly toward the valve element.

2. Apparatus according to claim 1, wherein said valve element is a rotary plug having a flow passage extending therethrough.

3. Apparatus according to claim 1, wherein said valve element is a flat gate reciprocable transversely to the flow passages.

* * * * *